(12) United States Patent
Kauffman (10) Patent No.: US 7,693,365 B2
(45) Date of Patent: Apr. 6, 2010

(54) DISPERSION MAPPING OF TRANSMITTED CHANNELS IN A WDM SYSTEM

(75) Inventor: Michael Kauffman, Campbell, CA (US)

(73) Assignee: Infinera Corporation, Sunnyvale, CA (US)

( * ) Notice: Subject to any disclaimer, the term of this patent is extended or adjusted under 35 U.S.C. 154(b) by 83 days.

(21) Appl. No.: 12/025,115

(22) Filed: Feb. 4, 2008

(65) Prior Publication Data

US 2009/0196615 A1    Aug. 6, 2009

(51) Int. Cl.
    *G02B 6/28*    (2006.01)
(52) U.S. Cl. .......................................... 385/24; 385/15
(58) Field of Classification Search ................. 385/15, 385/24
    See application file for complete search history.

(56) References Cited

U.S. PATENT DOCUMENTS

| | | | |
|---|---|---|---|
| 4,752,125 A | 6/1988 | Schicketanz et al. | |
| 4,799,790 A | 1/1989 | Tsukamoto et al. | |
| 5,488,501 A | 1/1996 | Barnsley | |
| 6,654,564 B1 | 11/2003 | Colbourne et al. | |
| 7,272,274 B1 * | 9/2007 | Albers et al. | 385/14 |
| 7,522,790 B1 * | 4/2009 | Whitty | 385/24 |
| 2003/0180051 A1 | 9/2003 | Veith et al. | |
| 2004/0047636 A1 | 3/2004 | Guild et al. | |
| 2007/0001722 A1 | 1/2007 | Young et al. | |
| 2007/0002430 A1 | 1/2007 | Mitchell et al. | |
| 2007/0009262 A1 | 1/2007 | Perkins et al. | |
| 2007/0019954 A1 | 1/2007 | Lu et al. | |
| 2007/0092177 A1 | 4/2007 | Nilsson et al. | |

* cited by examiner

*Primary Examiner*—Jennifer Doan
(74) *Attorney, Agent, or Firm*—David L. Soltz (57) ABSTRACT

Chromatic dispersion is determined based on the arrival times of different frames of data in a wavelength division multiplexed (WDM) system having an optical communication link. Namely, a first frame is transmitted on a first optical channel, which is supplied to the optical communication link. A second frame is then transmitted on a second optical channel and the transmission time difference between the two frames is obtained. At a receive end, the difference in arrival times of the two frames is measured to obtain a relative time delay between the first and second frames and used to determine a chromatic dispersion.

23 Claims, 7 Drawing Sheets

DISPERSION MAPPING OF TRANSMITTED CHANNELS IN A WDM SYSTEM

FIELD OF THE DISCLOSURE

The present disclosure relates to an apparatus and related method for determining or mapping an amount of chromatic dispersion in a fiber optic link.

BACKGROUND OF THE INVENTION

Optical signals transmitted in a fiber optic communication system typically constitute a series of pulses of digital information. Although the pulses are usually at a single nominal wavelength, each pulse is composed of different spectral components, which propagate through the transmission fiber at different speeds. This effect, known as "chromatic dispersion", can result in spectral components of one pulse arriving at a receiver at substantially the same time as a succeeding pulse, thereby causing degraded receiver sensitivity and higher bit error rates. Chromatic dispersion becomes increasingly pronounced at higher bit rates, e.g. 10 Gigabits/second and higher.

Many transmission optical fibers are non-dispersion shifted and have a "positive" chromatic dispersion, whereby higher frequency components travel slower than lower frequency components. Accordingly, dispersion compensated fiber (DCF) having a negative dispersion can be coupled to the transmission optical fiber in order to offset the chromatic dispersion thereof. The amount of dispersion experienced by an optical signal depends on the distance traveled through the transmission optical fiber. For longer transmission fiber lengths, more compensation, and, thus, longer lengths of DCF are required. Shorter lengths of DCF, however, are provided when less compensation is needed.

In a fiber optic network, different lengths or spans of transmission optical fiber are used to connect various points within the network. In addition, various components inserted into the optical transmission path, such as optical add-drop multiplexers (OADMs) can contribute to the chromatic dispersion associated with a particular span. If the network contains many spans, the dispersion associated with each span must be measured, which can be time consuming.

SUMMARY

In accordance with an aspect of the present disclosure, a communication method is provided including transmitting one of a first plurality of bits, which are carried by a first optical signal having a first wavelength. The method also includes transmitting one of a second plurality of bits after the one of the first plurality of bits has been transmitted, the second plurality of bits being carried by a second optical signal having a second wavelength different than the first wavelength. In addition, the method includes determining a first time interval between the transmission of one of the first plurality of bits and the transmission of one of the second plurality of bits. The method further includes supplying the first and second optical signals to an optical communication path; receiving the one of the first plurality of bits; and receiving the one of the second plurality of bits. Moreover, the method includes determining a second time interval between the reception of one of the first plurality of bits and the reception of one of the second plurality of bits; and determining a chromatic dispersion associated with the optical communication path based on the first and second intervals, and the difference in wavelength between the two optical transmitters.

Consistent with an additional aspect of the disclosure, a communication system is provided which includes a first transmitter circuit configured to output one of a first plurality of bits, the first plurality of bits being carried by an optical signal having a first wavelength. The system also includes a second transmitter configured to output one of a second plurality of bits after the one of the first plurality of bits has been transmitted, the second plurality of bits being carried by a second optical signal, the second optical signal having a second wavelength different than the first wavelength. In addition, the system includes an optical combiner configured to receive the first and second optical signals and supply the first and second optical signals to an optical communication path; and an optical demultiplexer having an input port coupled to the optical communication path and first and second output ports. The optical demultiplexer supplies the first optical signal at the first output port and the second optical signal at the second output port. The system also includes a first receiver circuit coupled to the first output port and configured to receive said one of the first plurality of bits; and a second receiver circuit coupled to the second output port and configured to receive said one of the second plurality of bits. Further, the system includes a control circuit coupled to the first and second receiver circuits and configured to determine a chromatic dispersion associated with the optical communication path based on first and second time intervals. The first time interval is between the outputting of the one of the first plurality of bits and the outputting of the one of the second plurality of bits, and the second time interval is between said reception of the one of the first plurality of bits and the reception of said one of the second plurality of bits.

Further consistent with the present disclosure, an optical communication device is provided which comprises an optical demultiplexer having an input port configured to receive a wavelength division multiplexed signal transmitted on an optical fiber. The wavelength division multiplexed signal includes a first optical channel having a first wavelength and a second optical channel having a second wavelength. The first optical channel carries a first frame having a first header portion, and the second optical channel carries a second frame having a second header portion. The optical demultiplexer has a first output port supplying the first optical channel and a second output port supplying the second optical channel. In addition, the optical communication device includes a first receiver circuit coupled to the first output port, and a second receiver circuit coupled to the second output port. The optical communication device further includes a control circuit coupled to the first and second receiver circuits, wherein a bit in the first header portion is transmitted before a bit in the second header portion by a first time interval, and the bit in the first header portion is received by the first receiver circuit before the bit in the second header portion is received by the second receiver circuit by a second time interval. The control circuit is configured to determine a chromatic dispersion associated with the optical fiber based on a difference between the first and second time intervals.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Consistent with the present disclosure, chromatic dispersion is determined based on the arrival times of different frames of data in a wavelength division multiplexed (WDM) system having an optical communication link. Namely, a first frame is transmitted on a first optical channel, which is supplied to the optical communication link. A second frame is then transmitted on a second optical channel and the transmission time difference between the two frames is obtained. At a receive end, the difference in arrival times of the two frames is measured to obtain a relative time delay between the first and second frames. The relative time delay is the sum of the transmission time difference and the propagation time difference (the time difference attributable to chromatic dispersion) between the two frames. Thus, by subtracting the transmission time difference from the relative time delay, the propagation time difference can be obtained. The chromatic dispersion in units of picoseconds/nm can then be calculated by dividing the propagation time difference by the difference in wavelength between the first and second channels.

Figure 1:
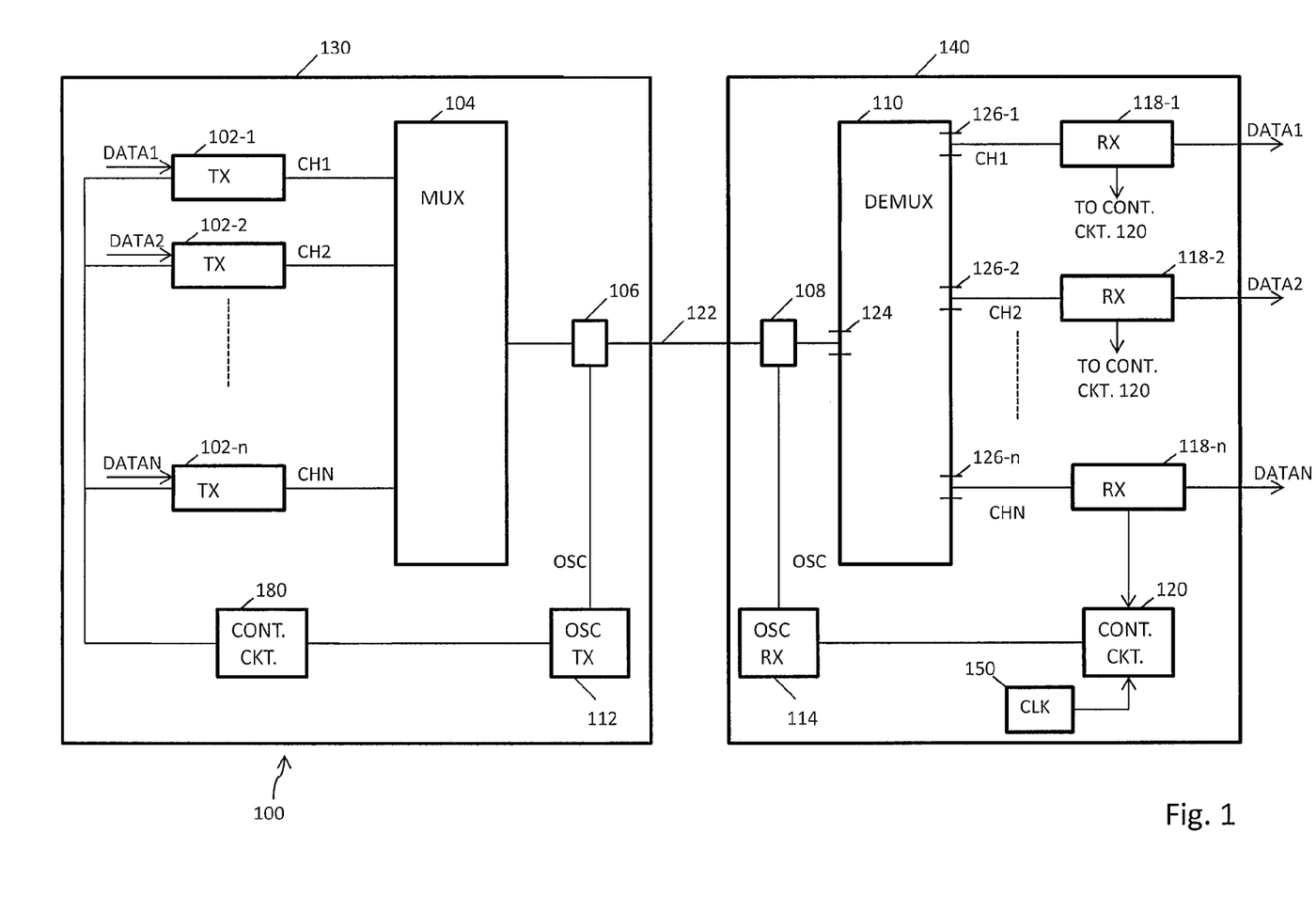
FIG. 1 is a block diagram of an optical communication system consistent with an aspect of the present disclosure.

FIG. 1 illustrates a communication system 100 consistent with an aspect of the present disclosure. Communication system 100 includes a plurality of transmitter circuits 102-1 to 102-n provided in a first terminal 130, each of which supplying a corresponding one of data modulated optical channels or optical signals CH1 to CHN in response to corresponding ones of data signals DATA1 to DATAN. Each data modulated optical channel CH1 to CHN includes a corresponding one of a plurality of wavelengths λ1 to λN. As further shown in FIG. 1, each optical transmitter circuit 102-1 to 102-n may optionally supply an output to control circuit 180, which, in turn, supplies an output to OSC transmitter circuit 112. Control circuit 180 is discussed in greater detail below.

As further shown in FIG. 1, each of optical channels CH1 to CHN are combined onto optical communication path 122, which typically includes one or more segments of optical fiber. Collectively, optical channels CH1 to CHN may constitute a wavelength division multiplexed signal.

A control circuit 180 is provided which monitors the timing at which various frames are transmitted from each of transmitter circuits 102-1 to 102-n and supplies a signal carrying such timing information to OSC transmitter circuit 112. In response to the signal output from control circuit 180, OSC transmitter circuit 112 outputs an OSC carrying the timing information. The OSC is fed to a known optical multiplexer or combiner 106, which combines the OSC onto optical communication path 122 with optical channels CH1 to CHN. Optical channels CH1 to CHN and the OSC propagate along optical communication path 122 to second terminal 140. If necessary, one or more optical amplifiers (not shown in FIG. 1) may be provided to amplify optical channels CH1 to CHN at predetermined locations along optical communication path 122.

At second or receive-end terminal 140, optical demultiplexer 108 may be coupled to optical communication path 122 to select and supply the OSC to OSC receiver circuit 114. Optical channels CH1 to CHN, however, may pass through demultiplexer to input port 124 of known optical demultiplexer 110, which typically includes one or more optical demultiplexing components, such as an arrayed waveguide grating and/or filters. Demultiplexer 110 outputs a corresponding one of optical channels CH1 to CHN at a respective one of output ports 126-1 to 126-N. Each of receiver circuits 118-1 to 118-N are coupled to a corresponding one of output ports 126-1 to 126-N and are configured to receive a respective one of optical channels CH1 to CHN.

As further seen in FIG. 1, OSC receiver circuit generates an output, which is supplied to control circuit 120. Control circuit 120 also receives a clock signal from clock circuit 130.

Figure 2:
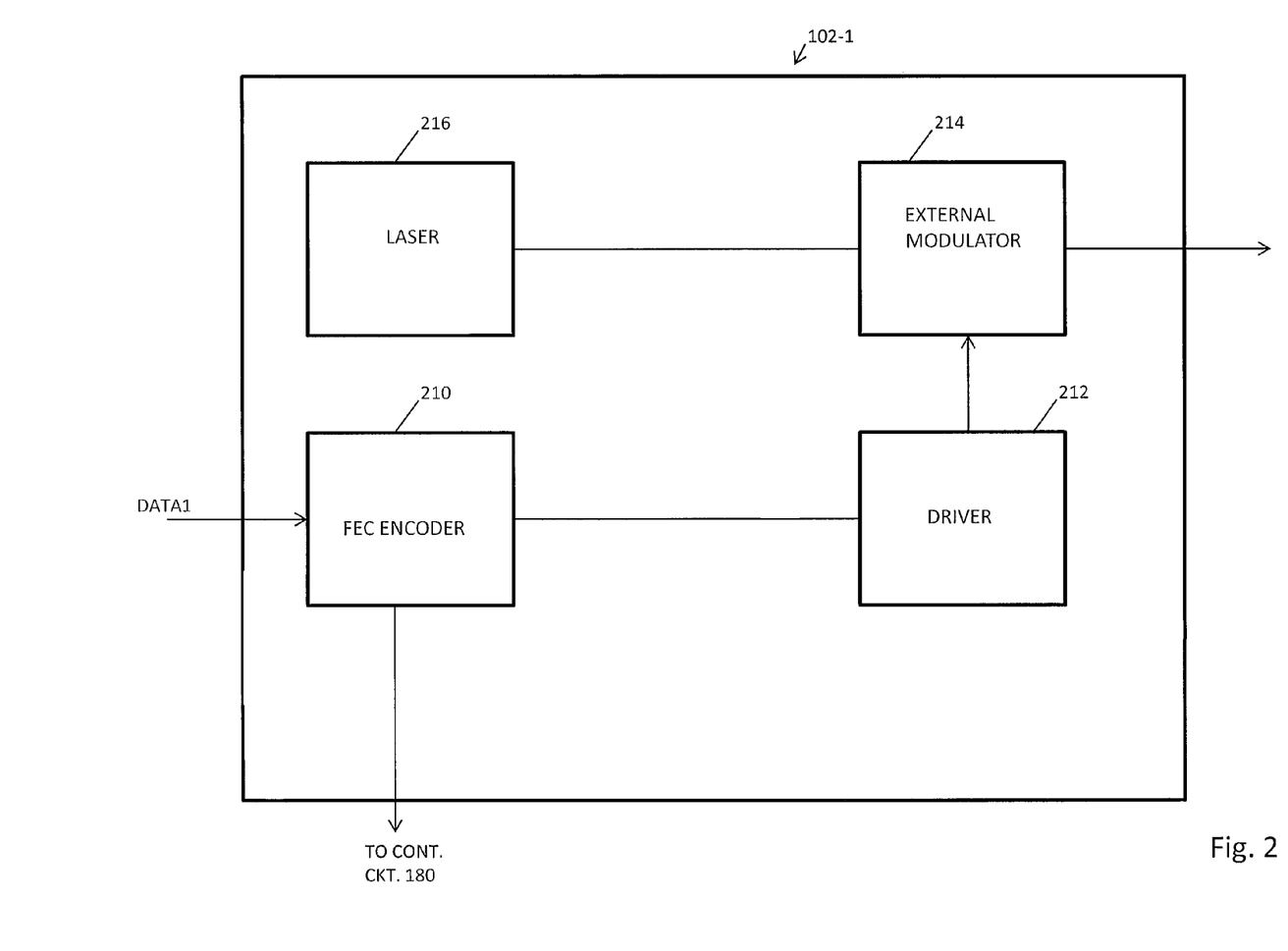
FIG. 2 is a block diagram of a transmitter circuit consistent a further aspect of the present disclosure.

FIG. 2 shows transmitter circuit 102-1 in greater detail. It is understood that transmitter circuits 102-2 to 102-N may have the same or similar structure as transmitter circuit 102-1. As shown in FIG. 2, data signal DATA1, in electrical form, is supplied to transmitter circuit 102-1 and fed to forward error correction (FEC) encoder 210, which encodes the data signal in accordance with a known code, such as a Reed-Solomon code. FEC encoder 210 outputs the encoded data as a series of frames, each of which including a header (to be discussed in greater detail below). The encoded data is supplied to a known driver circuit 212, which supplies appropriate drive signals to an external modulator 214. External modulator 214, which may include a Mach-Zehnder interferometer, modulates the output of laser 216 in accordance with the drive signal to generate modulated optical channel CH1 which carries the frames of FEC encoded data.

As further shown in FIG. 2, the output of FEC encoder circuit 210 is also supplied to control circuit 180, which may include appropriate circuitry to identify the header in each frame output from FEC encoder circuit 210 and determine a timing associated with the transmission of each such frame.

Figure 3:
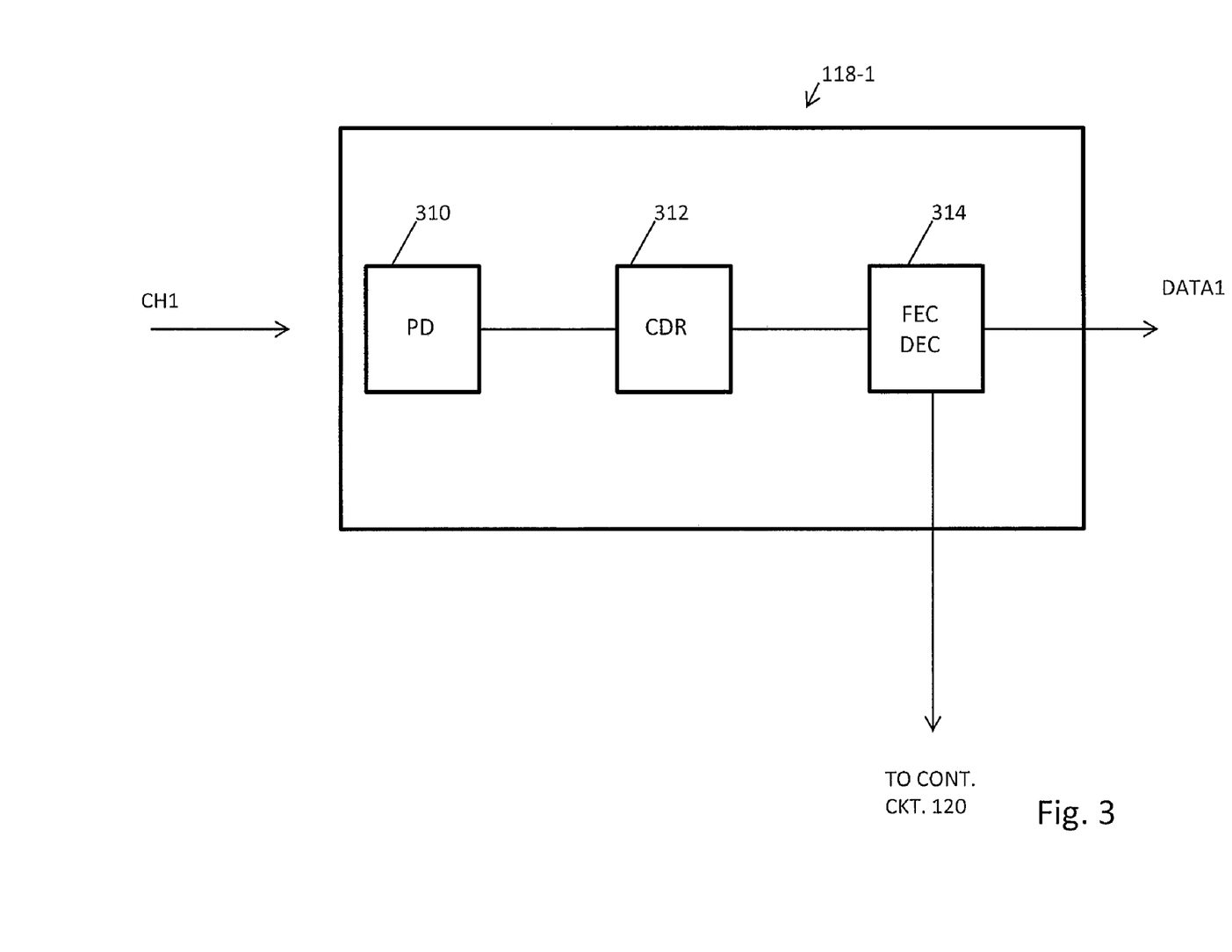
FIG. 3 is a block diagram of a receiver circuit consistent with another aspect of the present disclosure.

An exemplary receiver circuit 118-1 is shown in FIG. 3. Receiver circuits 118-2 to 118-N may have the same or similar structure as receiver circuit 118-1.

Photodetector (PD) 310 in receiver circuit 118-1 receives a corresponding one of optical channels CH1 to CHN, namely optical channel CH1. Photodetector 310 converts optical channel CH1 to a corresponding electrical signal, which is supplied to a known clock and data recovery circuit (CDR) 312, which, in turn, supplies FEC frames, to FEC decoder circuit 314. Decoder circuit 314 then decodes the received frames in a known manner and outputs the data signal DATA1. The FEC frames output from CDR circuit 312 are also supplied to control circuit 120 for determining a timing associated with the receipt of each such frame. The same code may be used to encode data signals DATA1 to DATAN in transmitter circuits 102-1 to 102-N and for decoding in receiver circuits 118-1 to 118-N.

Figure 4:
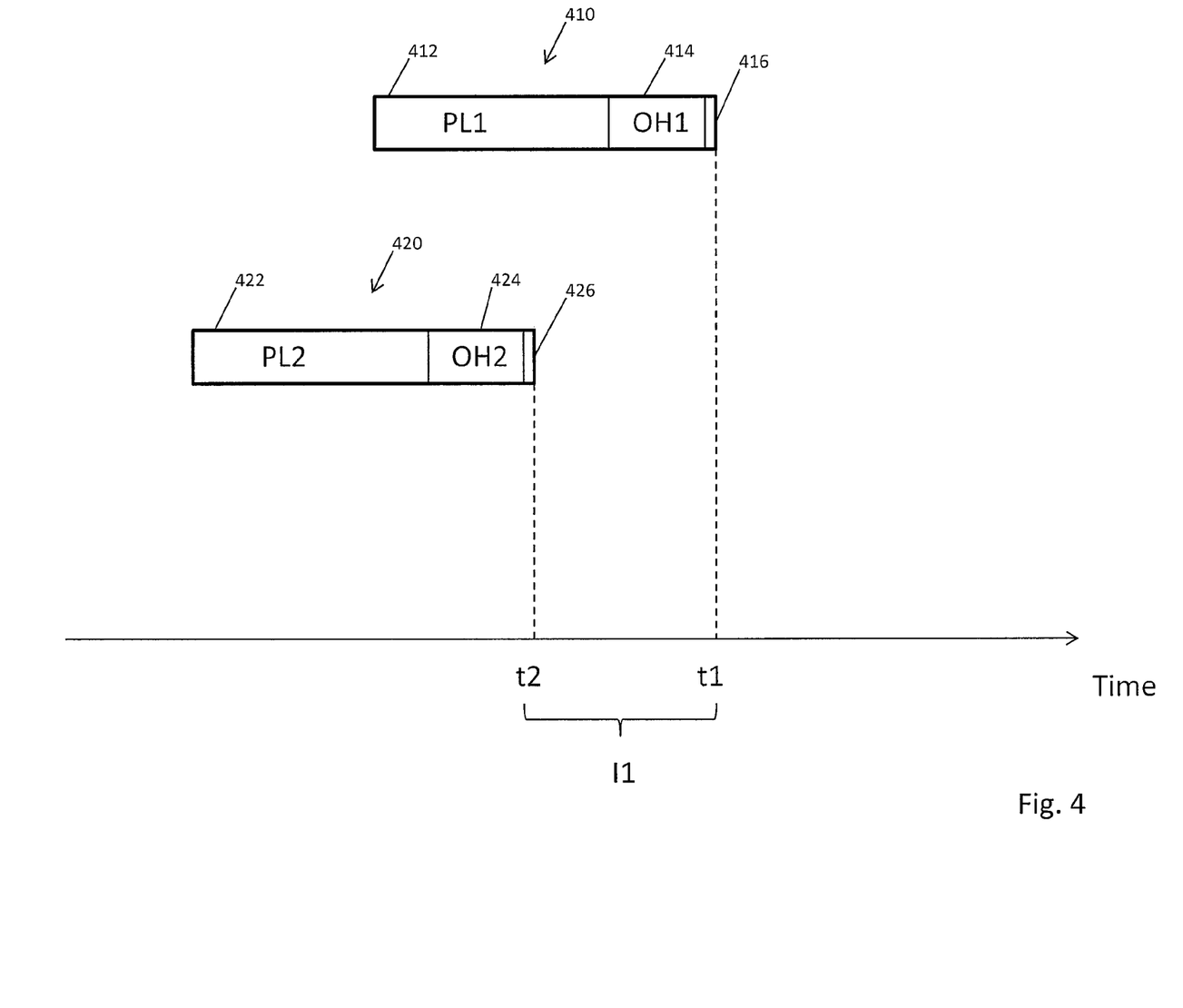
FIG. 4 is a timing diagram illustrating relative frame transmission times consistent with a further aspect of the present disclosure.
Figure 5:
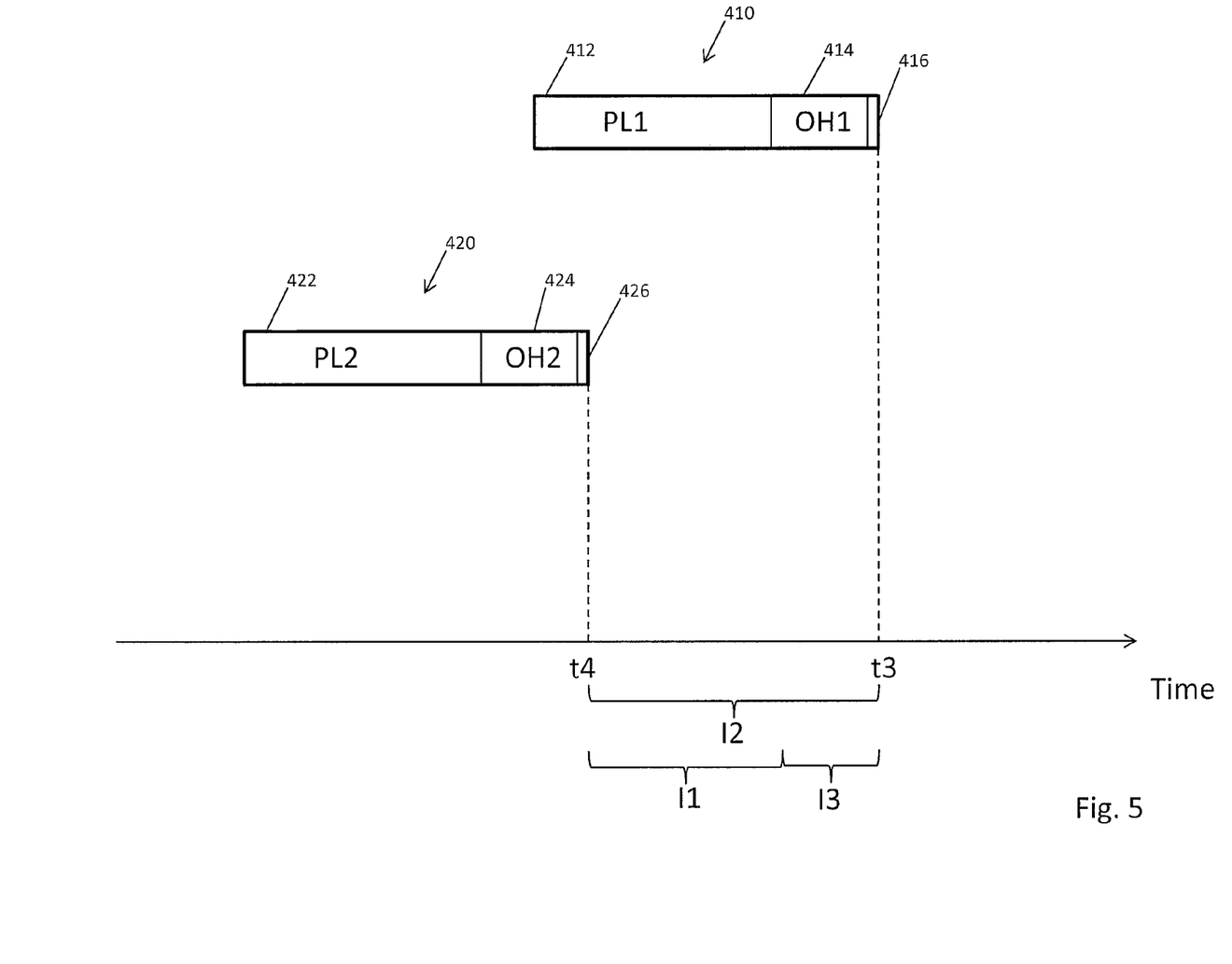
FIG. 5 is a timing diagram illustrating relative frame receive times consistent with an additional aspect of the present disclosure.
Figure 6:
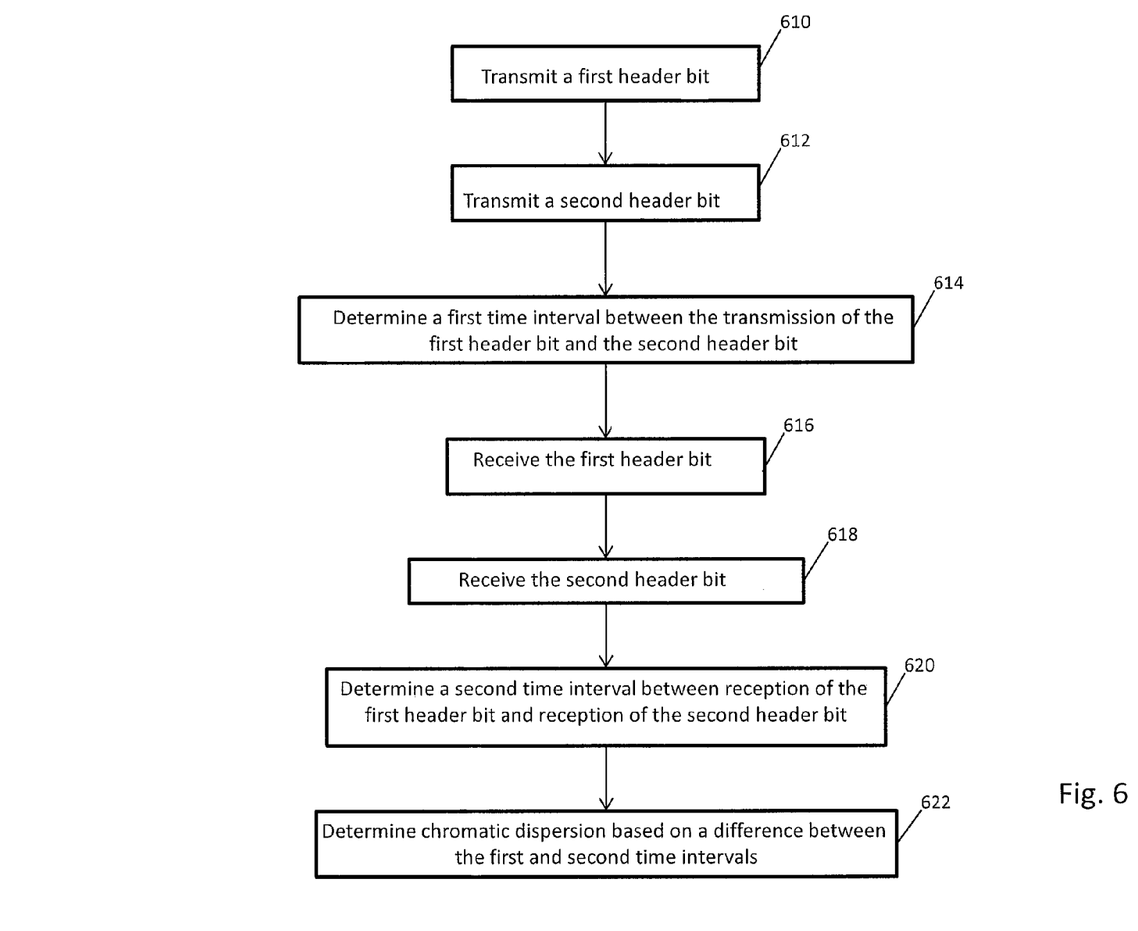
FIG. 6 is a flow chart of a method consistent with a further aspect of the present disclosure.

A method for determining dispersion compensation consistent with an additional feature of the present disclosure will next be described in connection with FIGS. 4-6 in which FIG. 4 is a timing diagram showing the relative transmission times of two frames of data; FIG. 5 is a timing diagram showing the relative receive times of the two frames; and FIG. 6 is a flowchart of a method consistent with the present disclosure.

As noted above, transmitter circuits 102-1 to 102-n output corresponding modulated optical channels CH1 to CHN. Each modulated optical channel or signal carries a series of frames of FEC encoded data. Two such frames, 410 (a first frame) and 402 (a second frame), carried by respective optical signals CH1 (a first optical signal) and CH2 (a second optical signal") are shown in FIG. 4. First frame 410 includes a payload portion ("PL1") 412 and a header portion ("OH1") 414. Header portion 414 (a "first header portion") includes a plurality of bits, one of which is bit 416. Header bit 416 ("first header bit") may be the first bit of header portion 414 or may be another bit within header portion 414. Consistent with the present disclosure, header bit 416 may be transmitted at time t1 (step 610 in FIG. 6), followed by the rest of frame 402.

After bit 416 has been transmitted, a second frame 420, including payload (422) and header (424) portions may be transmitted. Header portion 424 (a "second header portion") includes a plurality of bits, one of which being bit 426, which may be transmitted at a second time t2 after time t1 (step 612 in FIG. 6). Data related to transmission times t1 and t2 may be supplied to optical service channel (OSC) transmitter circuit 112 (see FIG. 1). Based on times t1 and t2, a time interval ("first time interval") I1 between the transmissions of the first (416) and second (426) header bits may be determined by appropriate circuitry provided in control circuit 180. Alternatively, the transmission time-related data may be provided by other circuitry external to control circuit 180 for determining the first time interval I1. For example, such external circuitry may be provided in OSC transmitter circuit 112. In any event, information associated with first time interval I1 is typically supplied to control circuit 180, which, in turn, supplies the first time interval information to OSC transmitter circuit 112. Next, OSC transmitter circuit 112 generates an optical service channel that carries the first time interval information. As further noted above in reference to FIG. 1, the optical service channel is typically at a wavelength different than that of optical signals CH1 to CHN and is supplied to optical communication path 122 for transmission from terminal 130 to terminal 140.

In an alternative embodiment, the first time interval data may be transmitted in-band, whereby such data is included in the payload of a frame transmitted by one of transmitter circuits 102-1 to 102-n. In that case, the first time interval data is carried by an optical signal having one of the wavelengths associated with channels CH1 to CHN.

FIG. 5 illustrates the relative receive times of bits 416 and 426 of header portions 414 and 424, respectively. Namely, bit 416 may arrive at receiver circuit 118-1 at time t3 (step 616), while bit 426 may arrive at receiver circuit 118-2 at time t4 (step 618). In one exemplary embodiment, receiver circuit 118-1 may supply a first indicator of the arrival of bit 416 to control circuit 120. Receiver circuit 118-2 may then supply a second indicator of the arrival of bit 426 to control circuit 120. Control circuit 120 may then count the number of clock cycles generated by clock circuit 150 between the reception of bit 416 and the reception of bit 426 to determine a second time interval I2 (step 620).

In the absence of any chromatic dispersion, the difference in transmission times t1 and t2, i.e., time interval I1, should equal the difference in arrival times t3 and t4, i.e., time interval I2. Put another way, in the absence of chromatic dispersion, channels CH1 and CH2 would travel in optical communication path at the same speed. As noted above, however, light at different wavelengths typically travels at different speeds in an optical fiber. Accordingly, in the example shown in FIG. 5, channel CH2 travels slower than channel CH1 so that the difference in arrival times at terminal 140 (time interval I2) is greater than the difference in transmission times from terminal 130 (time interval I1). Thus, the second interval I2 equals the sum of the first interval (I1) plus a third interval (I3), which is the propagation time difference or arrival time delay attributable to chromatic dispersion in optical communication path 122. By subtracting first time interval I1 from time interval I2, I3 can be obtained. Chromatic dispersion in units of picoseconds/nm may then be calculated by dividing time interval I3 by the difference in wavelength between channels CH1 and CH2 at terminal 130. It is contemplated, however, that optical signal CH2 may travel faster than channel CH1 and the amount of dispersion may be determined in a similar manner as that described above.

Returning to FIG. 1, control circuit may be configured to: (1) determine time interval I2 (step 620) based on the arrival times of bits 416 and 426; (2) determine time interval I3 in the manner discussed above, i.e., by subtracting time interval I1 from time interval I3; and (3) to further determine a chromatic dispersion value (CDV) associated with optical communication path 122 by dividing time interval I3 by the difference in wavelength between channels CH1 and CH2 at terminal 130 (step 622).

As further noted above, the first time interval data may be supplied in-band such that one of receiver circuits 118-1 to 118-n may supply such data to control circuit 120 in addition to the arrival indicators discussed above.

It is noted that control circuit 120 may include hard-wired circuits or may be a suitably programmed microprocessor configured to determine the second interval I2 and the chromatic dispersion in the exemplary manner discussed above.

Figure 7:
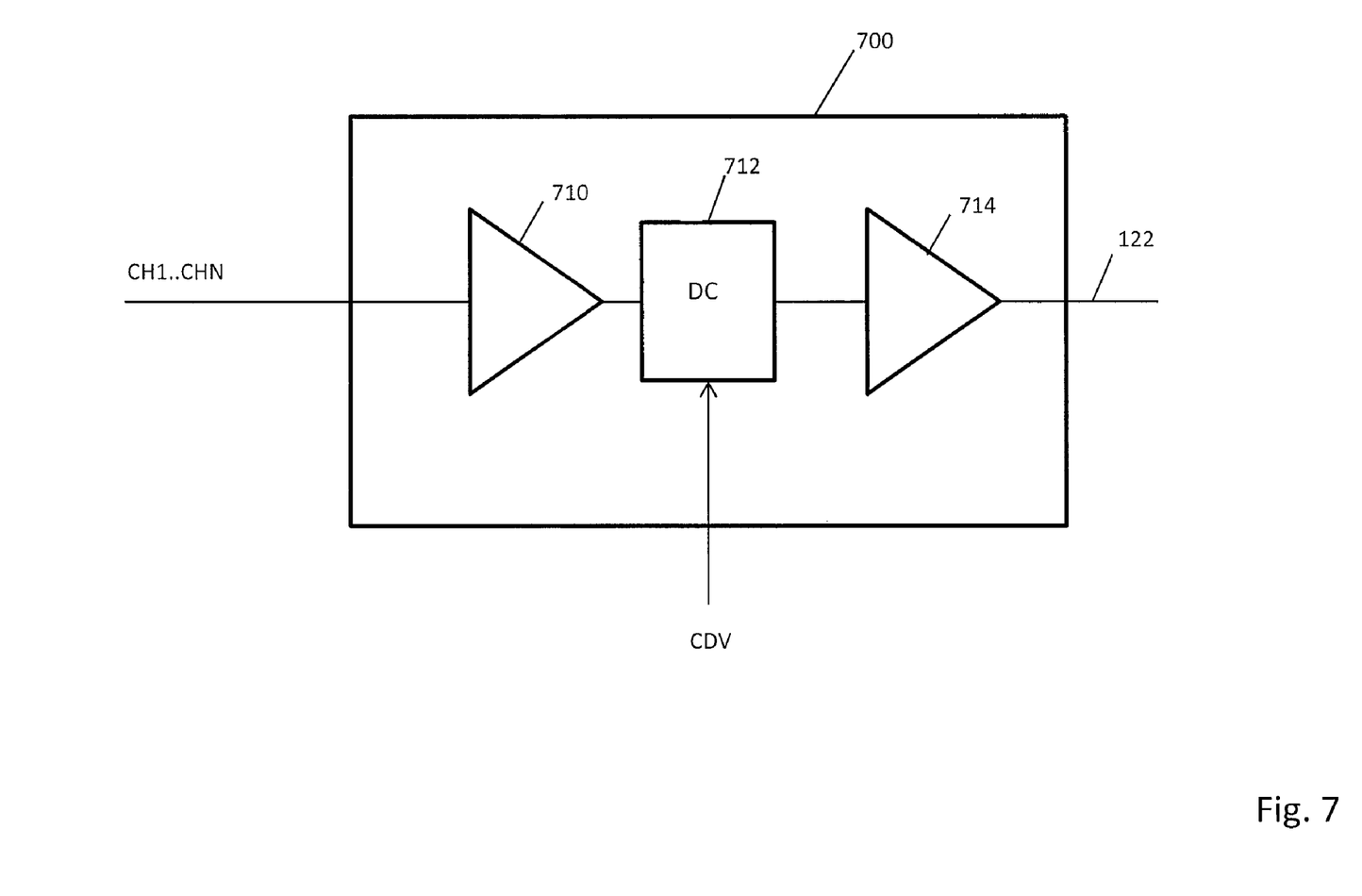
FIG. 7 shows an optical amplifier consistent with an additional aspect of the present disclosure.

Consistent with a further aspect of the present disclosure, the chromatic dispersion value (CDV) can be used to perform dispersion compensation in one or more of receivers 118-1 to 118-n in a known manner. Alternatively, the chromatic dispersion value determined by control circuit 120 may be supplied to one or more components or network elements coupled along optical communication path 122. For example, as shown in FIG. 7, the chromatic dispersion value (CDV) may be supplied to a known variable dispersion compensator (DC) component 712 coupled between first (710) and second (714) amplification stages of optical amplifier 700. As generally understood, stages 710 and 714 may include erbium doped fibers for providing gain to optical signals CH1 to CHN and variable DC 712 may provide a suitable amount of dispersion compensation to these signals prior to reaching the receive-end terminal 140.

Other embodiments of the invention will be apparent to those skilled in the art from consideration of the specification and practice of the invention disclosed herein. For example, although dispersion based on the arrival time of frames transmitted over two channels is described above, it is understood that dispersion may be determined based on the arrival of any number of frames transmitted on any number of channels. In addition, it is understood that markers other than header bits in the FEC frames described above may be used to measure time intervals I1 and I2. For example, any specific bit sequence or particular pattern can be used as a marker. For example, header bits or other bits in an Ethernet frame may be used to determine intervals I1 and I2. In addition, it is understood that the time intervals and wavelength differences can be calculated between any and all pairs of transmission channels (e.g., channels CH1 to CHN), and the data combined or averaged to improve the fidelity of the dispersion measurement. It is intended that the specification and examples be considered as exemplary only, with a true scope and spirit of the invention being indicated by the following claims.

What is claimed is:

1. A communication method comprising:
   transmitting one of a first plurality of bits, the first plurality of bits being carried by a first optical signal having a first wavelength;
   transmitting one of a second plurality of bits after said one of the first plurality of bits has been transmitted, the second plurality of bits being carried by a second optical signal having a second wavelength different than the first wavelength;
   determining a first time interval between the transmission of said one of the first plurality of bits and the transmission of said one of the second plurality of bits;
   supplying the first and second optical signals to an optical communication path;
   receiving said one of the first plurality of bits;
   receiving said one of the second plurality of bits;
   determining a second time interval between the reception of said one of the first plurality of bits and said reception of said one of the second plurality of bits; and
   determining a chromatic dispersion associated with the optical communication path based on the first and second intervals.

2. A communication method in accordance with claim 1, wherein said determining the chromatic dispersion includes determining a difference between the first and second intervals.

3. A communication method in accordance with claim 1, wherein the optical communication path includes an optical fiber, said communication method further includes combining the first and second optical signals onto the optical fiber.

4. A communication method in accordance with claim 1, wherein the first optical signal carries a first frame, the first plurality of bits being a first header portion of the first frame, and the second optical signal carries a second frame, the second plurality of bits being a second header portion of the second frame.

5. A communication method in accordance with claim 4, further comprising:
   encoding first information in accordance with a forward error correction code, the first frame including the encoded first information; and
   encoding second information in accordance with the forward error correction code, the second frame including the encoded second information.

6. A communication method in accordance with claim 1, wherein said transmission of said one of the first plurality of bits and said transmission of said one of the second plurality of bits are from a first terminal coupled to a first end of the optical communication path, and said reception of said one of the first plurality of bits and said reception of said one of the second plurality of bits are at a second terminal coupled to a second end of the optical communication path, the method further including supplying information associated with the first time interval to the second terminal.

7. A communication method in accordance with claim 6, wherein said supplying the information includes transmitting a third optical signal from the first terminal to the second terminal on the optical communication path, the third optical signal carrying the information and having a third wavelength different than the first and second wavelengths.

8. A communication method in accordance with claim 6, wherein the information is carried by a third optical signal having the first wavelength, said supplying the information including transmitting the third optical signal on the optical communication path.

9. A communication method in accordance with 2, wherein said determining further includes dividing the difference between the first and second intervals by a difference between the first and second wavelengths.

10. A communication system comprising:
    a first transmitter circuit configured to output one of a first plurality of bits, the first plurality of bits being carried by an optical signal having a first wavelength;
    a second transmitter circuit configured to output one of a second plurality of bits after said one of the first plurality of bits has been transmitted, the second plurality of bits being carried by a second optical signal, the second optical signal having a second wavelength different than the first wavelength;
    an optical combiner configured to receive the first and second optical signals and supply the first and second optical signals to an optical communication path;
    an optical demultiplexer having an input port coupled to the optical communication path and first and second output ports, the optical demultiplexer supplying the first optical signal at the first output port and the second optical signal at the second output port;
    a first receiver circuit coupled to the first output port and configured to receive said one of the first plurality of bits;
    a second receiver circuit coupled to the second output port and configured to receive said one of the second plurality of bits; and
    a control circuit coupled to the first and second receiver circuits, the control circuit being configured to determine a chromatic dispersion associated with the optical communication path based on first and second time intervals, the first time interval being between said outputting of said one of the first plurality of bits and said outputting of said one of the second plurality of bits, and said second time interval being between said reception of said one of the first plurality of bits and said reception of said one of the second plurality of bits.

11. A communication system in accordance with claim 10, wherein the control circuit is configured to determine the chromatic dispersion based on a difference between the first and second time intervals.

12. A communication system in accordance with claim 10, wherein the first plurality of bits is a first overhead portion of a first frame and the second plurality of bits is a second overhead portion of a second frame.

13. A communication system in accordance with claim 10, wherein the first transmitter includes a first error correction encoder and the second transmitter includes a second forward error correction encoder, such that the first transmitter supplies a first frame including first encoded information, the first plurality of bits being a first header portion of the first frame, and the second transmitter supplies a second frame including second encoded information, the second plurality of bits being a second header portion of the second frame.

14. A communication system in accordance with claim 10, further including:
a third transmitter circuit optically coupled to the optical communication path, the third transmitter being configured to output a third optical signal carrying information associated with the first time interval, the third optical signal including a third wavelength different than the first and second wavelengths.

15. A communication system in accordance with claim 14, further including a third receiver circuit configured to receive the third optical signal from the optical communication path, the third receiver circuit being coupled to the control circuit, such that the control circuit receives the information.

16. A communication system in accordance with claim 10, wherein the first transmitter outputs a third optical signal having the first wavelength, the third optical signal carrying information associated with the first time interval.

17. A communication system in accordance with claim 16, wherein the control circuit receives the information from the first receiver circuit.

18. A communication system in accordance with claim 11, wherein the control circuit is further configured to determine the chromatic dispersion by dividing the difference between the first and second time intervals by a difference between the first and second wavelengths.

19. An optical communication device, comprising:
an optical demultiplexer having an input port configured to receive a wavelength division multiplexed signal transmitted on an optical fiber, the wavelength division multiplexed signal including a first optical channel having a first wavelength and a second optical channel having a second wavelength, the first optical channel carrying a first frame having a first header portion, and the second optical channel carrying a second frame having a second header portion, the optical demultiplexer having a first output port supplying the first optical channel and a second output port supplying the second optical channel;
a first receiver circuit coupled to the first output port;
a second receiver circuit coupled to the second output port; and
a control circuit coupled to the first and second receiver circuits,
wherein a bit in the first header portion is transmitted before a bit in the second header portion by a first time interval, and the bit in the first header portion is received by the first receiver circuit before the bit in the second header portion is received by the second receiver circuit by a second time interval, the control circuit being configured to determine a chromatic dispersion associated with the optical fiber based on a difference between the first and second time intervals.

20. An optical communication device in accordance with claim 19, wherein the optical demultiplexer is a first optical demultiplexer, the optical communication device further including:
a second optical demultiplexer having an output port, the output port of the second optical demultiplexer supplying a third optical channel having a third wavelength different than the first and second wavelengths, the third optical channel carrying information associated with the first time interval; and
a third receiver circuit configured to receive the third optical signal, the third receiver circuit being coupled to the control circuit.

21. An optical communication device in accordance with claim 19, wherein the first optical channel carries information associated with the first time interval.

22. An optical communication device in accordance with claim 19, wherein the first frame includes information encoded in accordance with a forward error correction code, the first receiver circuit including a decoder circuit configured to decode the information.

23. An optical communication device in accordance with claim 19, wherein the control circuit includes a clock circuit, the clock circuit being configured to measure the second time interval.

* * * * *